Figure 1:
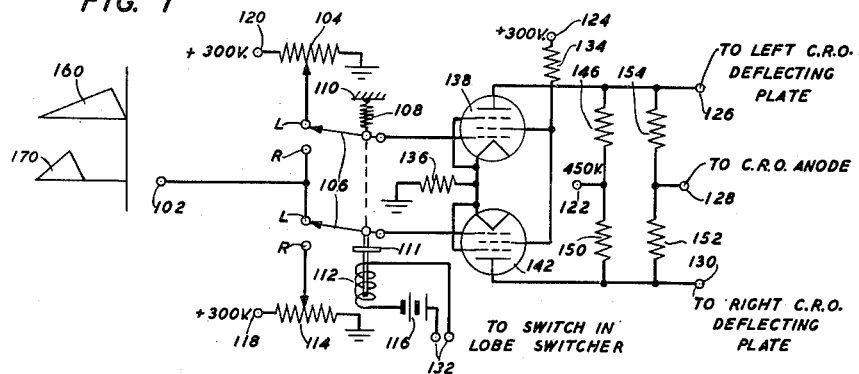

July 5, 1949.  E. A. KRAUTH  2,475,188

SWEEP AMPLIFIER

Filed Dec. 20, 1944

INVENTOR
E. A. KRAUTH
BY
H. O. Wright
ATTORNEY

Patented July 5, 1949

2,475,188

UNITED STATES PATENT OFFICE 2,475,188

SWEEP AMPLIFIER

Edwin A. Krauth, New York, N. Y., assignor to Bell Telephone Laboratories, Incorporated, New York, N. Y., a corporation of New York Application December 20, 1944, Serial No. 568,989

2 Claims. (Cl. 179—171)

This invention relates to an improved type of sweep amplifier for use with cathode ray oscilloscopes or equivalent devices. More particularly it relates to sweep amplifiers having an unbalanced input and a balanced output, the output "polarity" of which can be conveniently reversed.

For the purposes of this application the "polarity" of a sweep voltage is to be be understood to be related to the direction in which the voltage will cause the ray of an associated oscilloscope to be deflected. A reversal in the "polarity" of the sweep voltage will then be a change such as to cause said ray to be deflected in the opposite direction.

This type of amplifier is particularly well adapted for use with special radar systems of the type, for example, which is described in detail in the copending application of W. H. Doherty, Serial No. 570,939, filed January 1, 1945, now Patent No. 2,471,264, granted May 24, 1949, and assigned to applicant's assignee and for use in which this type of amplifier was especially designed.

Amplifiers of the invention have, however, other obvious uses in which their particular properties are of value, including, for example, stereoscopic systems in which it is desired to present two adjacent "pictures" representing a "left-eye view" and a "right-eye view" of a particular scene in order to provide a sense of depth, or in any system in which it is desired to present two patterns of indications simultaneously and in juxtaposition to facilitate comparison.

A particular object of the invention is, then, to provide a sweep amplifier which will provide a balanced output, the "polarity" of which can be readily reversed.

Other and further objects will become apparent during the course of the following detailed description of an illustrative embodiment of the invention and from the appended claims.

In the drawing accompanying this application

Figure 2:
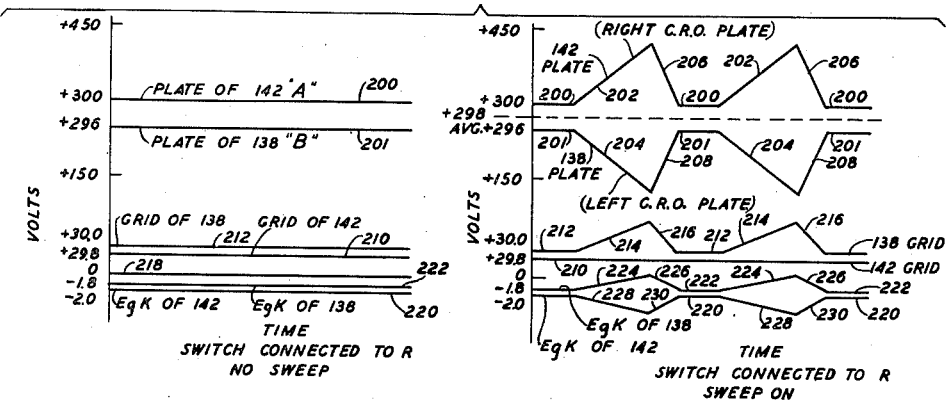
Figure 3:
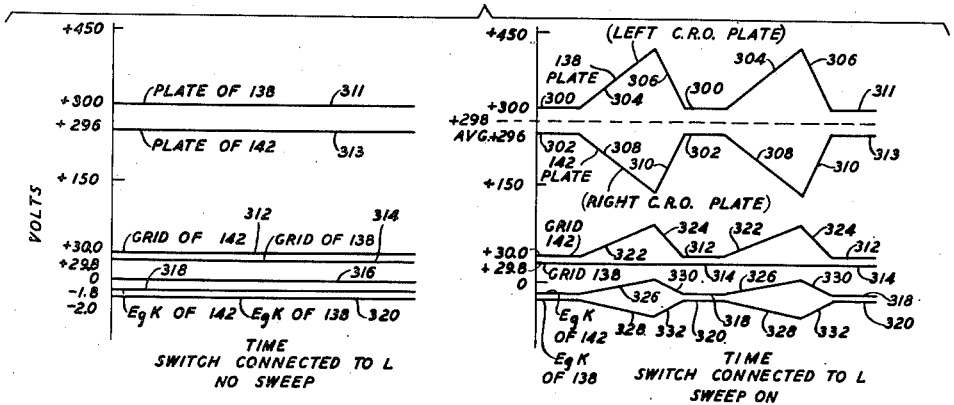

Fig. 1 shows in electrical schematic diagram form an amplifier of the invention; and Figs. 2 and 3 show voltage curves illustrative of the operation of the amplifier of Fig. 1.

In more detail in Fig. 1, a suitable sweep voltage wave such, for example, as the indicated sawtooth wave 160, or the saw-tooth wave 170, is impressed upon input terminal 102.

A double-pole, double-throw switching mechanism 106 is mechanically coupled with an electromechanical device 112 which can be, for example, a solenoid having an armature 111, device 112 being operated by energy from a suitable source such as battery 116 when terminals 132 are short-circuited. In operation, terminals 132 are, of course, connected to an external switching device (not shown) which will short-circuit terminals 132 during the intervals in which a reversal of the "polarity" of the sweep voltage appearing across output terminals 126, 130 is desired, an example of the use of this amplifier in a radar system being described in detail in the above-mentioned copending application of W. H. Doherty.

When the terminals 132 are open-circuited, as shown in Fig. 1, armature 111 will be released and spring 108 will contract, drawing switch 106 to its upper or left (L) position.

Alternatively, assuming an external control switch to be short-circuiting terminals 132, armature 111 will then be drawn to its lower or "right" (R) position against the tension of the retractile spring 108, one end of which is anchored to a point 110 of the chassis of the amplifier.

The amplifier of Fig. 1 is of the phase-inverter cathode type, known to those skilled in the art, which provides a "balanced" output but operates from an unbalanced input. The positive terminals of 300-volt direct current potential sources, not shown, but which can be simple batteries, or suitable rectifiers operating from alternating current supplies, are connected to terminals 118, 120 and 124, as indicated, and the positive terminal of a 450-volt direct current source, not shown, is connected to terminal 122 as indicated, of the amplifier, for normal operation, the negative terminals of all said sources being grounded. Alternatively, a unitary potential source providing +300 volts and +450 volts direct current, its negative terminal being grounded, can be employed and suitable isolating impedances employed in the several circuits just mentioned in accordance with principles well known to those skilled in the art.

With switch 106 in its upper position, potentiometer 164 provides a convenient means for adjusting the potential of the control grid (the grid immediately adjacent the cathode) of pentode vacuum tube 138. Similarly with switch 106 in its lower position, potentiometer 114 provides means for adjusting the potential of the control grid of pentode vacuum tube 142. The second or middle grids of both of these pentodes are connected together and through resistor 134 to the positive 300-volt supply normally connected to terminal 124. The third grids (immediately adjacent the anodes) of both pentodes are connected to their respective cathodes, which latter are connected together and through resistor 136 to ground. The anodes of pentodes 138 and 142 connect directly to output terminals 126 and 130 respectively, and through load resistors 146 and 150 respectively, to terminal 122 which is normally maintained at 450 volts (positive) with respect to ground. A voltage divider comprising resistors 152 and 154 maintains terminal 128 at a potential mid-way between the potentials at terminals 126 and 130.

In the usual terms employed in the art, with switch 106 in its upper or left position, the circuit including vacuum tube 142 is a single stage amplifier and the circuit including vacuum tube 138 is a phase inverter stage coupled to the amplifier stage through the cathode resistor 136, common to these two circuits. This arrangement provides a balanced or "push-pull" output which is particularly desirable for the present purposes since it is a convenient way to obtain sweep voltages of the desired magnitude. Furthermore, as is well known to those skilled in the art, the balanced nature of the output maintains good focus of the oscilloscope ray over the entire screen. The phase inverter stage is provided with an independent adjustable direct current biasing circuit for its control grid (i. e., the grid nearest the cathode). This biasing circuit comprises potentiometer 104, the ungrounded terminal 120 of which is connected to the positive terminal of a 300-volt direct current source as previously mentioned.

This use of an adjustable independent bias facilitates the adjustment of the balance of the amplifier and further contributes towards the ease with which a reversal of the polarity or "direction" of the amplified sweep wave appearing across terminals 126 and 130 can be effected, since by simply operating the solenoid 112 (by the short circuiting of the terminals 132 as described above) to throw switch 106 to its lower (or right) position it is at once evident that the circuit including vacuum tube 138 now becomes the amplifier stage and the circuit including vacuum tube 142 becomes the phase inverter stage. The control grid of this latter stage now derives its bias from potentiometer 114 the ungrounded terminal 118 of which is connected to the positive terminal of a 300-volt direct current supply source as mentioned above. The desired reversal of polarity at terminals 126, 130 is thereby accomplished. The use of a double vertical center line between the two images on the screen of an associated oscilloscope, or equivalent indicating device, as shown, for example, by line 230 of Fig. 2 of the above-mentioned application of W. H. Doherty, in combination with the flexibility of adjustment afforded by the provision of an independent adjustable bias on the control grid of either tube 138 or 142, when acting as the phase inverter, facilitates adjustment of the horizontal left and right sweeps to zero since each can then be made to coincide with the nearer one of the lines. If a single line were employed it would be somewhat more difficult to determine when both the right and left horizontal sweep lines had been adjusted to precisely coincide with their respective zero lines without overlapping the other image. Also deviation from the zero lines during normal operation of the system is more readily detected if two separated zero lines are employed.

In passing it should be noted that the insertion of a polarity reversing switch at terminals 126, 130 is not practicable nor desirable because of the high potentials and high impedance levels involved at this point in the circuit.

The operation of the reversible balanced sweep amplifier of Fig. 1 is illustrated by the voltage waves shown in Figs. 2 and 3.

Fig. 2 illustrates the approximate voltage relations existing at the control grids, plates (anodes), and in the grid-cathode circuits ($E_{gk}$) of the pentodes 138 and 142 of the amplifier of Fig. 1 when switch 106 is in the lower or right (R) position. The straight horizontal lines at the left of Fig. 2 show these voltage relations when no sweep impulses are being furnished to terminal 102 of Fig. 1.

Lines 200 and 201 represent the potentials of the anodes of tubes 142 and 138 respectively. Lines 210 and 212 represent the potentials of the control grids of tubes 142 and 138 respectively. Lines 220 and 222 represent the potentials developed in the grid cathode circuits of tubes 142 and 138 respectively.

When the sweep is on and sweep pulses, such as 160 or 170, are being furnished to terminal 102, Fig. 1, the voltage relations shown at the right of Fig. 2 obtain. Two successive cycles of the sweep voltage are shown and are, of course, substantially identical.

The anode of tube 142 has its interpulse value of +300 volts, line 200, and rises linearly to a maximum approaching +450 volts, line 202, returning more rapidly, line 206, to +300 volts, while the anode of tube 138 has an interpulse value of +296 volts, line 201, which decreases linearly to a minimum approaching +150 volts, line 204, returning more rapidly, line 208, to +296 volts so that the average potential of the anodes of tubes 142 and 138 remains constantly +298 volts. This is, of course, the recognized optimum condition for maintaining a good focus of the beam of the associated cathode ray oscilloscope, throughout the entire sweep of the ray in response to the deflecting voltages.

The grid voltage variation of tube 138 is represented by lines 212, 214 and 216 for the above-described variation cycle, the grid of tube 142 remaining constant, line 210.

The grid-cathode circuit voltage cycles for tubes 142 and 138 are represented by lines 220, 228 and 230 and lines 222, 224 and 226 respectively, for the above-described variation cycle of anode potentials.

In Fig. 3 the voltages and their variation cycles are represented for the upper (or left) position of the switch 106. From inspection it is obvious that they are identical but interchanged with respect to the two tubes 142 and 138 so that the output voltages appearing between terminals 126 and 128 and between terminals 130 and 128 are merely interchanged. In other words, for the "no sweep" condition illustrated at the left in Fig. 3, the anode potential of tube 138 is now +300 volts, line 311, while that of the anode of tube 142 is +296 volts, line 313. The control grid voltage of tube 142 is +30.0 volts, line 312, and that of tube 138 is +29.8 volts, line 314. The grid-cathode circuit voltage of tube 142 is −1.8 volts, line 318, and that of tube 138 is −2.0 volts, line 320.

For the "sweep on" condition illustrated to the right of Fig. 3, the anode voltage of tube 138 follows lines 300, 304 and 306 and that of tube 142 follows lines 302, 308 and 310. The control grid of tube 142 follows lines 312, 322 and 324 while that of tube 138 is constant at +29.8 volts, line 314. The grid-cathode circuit voltage of tube 142 follows lines 318, 322 and 324 while that of tube 138 follows lines 320, 328 and 332, as shown in Fig. 3. It is thus apparent that a right or left deflection of the ray of the oscilloscope from a position near the center of the screen can be obtained by the arrangement of Fig. 1, the direction of sweep being determined by the position of switch 106. It should be noted as a desirable condition that the mean or average value of the anode (or plate) voltages of the two vacuum tubes should be substantially the same for both left and right sweeps as exemplified in Figs. 2 and 3 where the average for both figures is +298 volts.

Numerous other arrangements within the spirit and scope of the invention will occur to those skilled in the art. The scope of the invention is defined in the following claims.

What is claimed is:

1. A sweep amplifier comprising a pair of vacuum tubes, each tube having at least an anode, a control electrode and a cathode, the cathodes of said tubes being connected together, a resistor connected between the cathodes and ground, an input terminal connected to the control electrode of one tube, an adjustable source of direct current bias potential connected to the control electrode of the other tube, a resistor in each anode circuit connecting the anodes of each of said pair of tubes to the positive terminal of a high voltage direct current supply, said resistors being substantially identical, a pair of output terminals connected to the anodes of said tubes respectively, a second pair of substantially identical resistors connected in series and shunted across said pair of output terminals, a third output terminal connected to the junction of said last-stated pair of resistors with each other, a first switch for disconnecting the control electrode of said one tube from the input terminal of said amplifier and connecting it to a second adjustable source of direct current bias potential, and a second switch mechanically ganged with said first switch for simultaneously disconnecting the control electrode of said other tube from said first-stated adjustable source of direct current bias potential and connecting it to said input terminal of said amplifier.

2. An unbalanced-input, balanced-output, sweep amplifier which includes in combination a pair of vacuum tubes each having at least a cathode, an anode and a control-electrode, said cathodes being connected together, a resistor connected between said cathodes and ground, a pair of independent adjustable control-electrode bias sources associated with said pair of vacuum tubes, respectively, an ungrounded input terminal, and a pair of two position switching means connecting to the control-electrodes of said pair of vacuum tubes, respectively, each switching means being operable to connect, in one position, its associated control-electrode to said ungrounded input terminal and, in the other position, to the associated one of said independent adjustable control-electrode bias sources, respectively, said pair of switching means being ganged, or connected together mechanically, so that when one control electrode is connected to said ungrounded input terminal, the other control electrode is connected to its associated independent adjustable control electrode bias source and vice versa.

EDWIN A. KRAUTH.

REFERENCES CITED

The following references are of record in the file of this patent:

UNITED STATES PATENTS

| Number | Name | Date |
| --- | --- | --- |
| 1,978,684 | McCreary | Oct. 30, 1934 |
| 2,208,254 | Geohegan | July 16, 1940 |
| 2,264,197 | Hadfield | Nov. 25, 1941 |
| 2,286,894 | Browne et al. | June 16, 1942 |
| 2,369,138 | Cook | Feb. 13, 1945 |